United States Patent
Chang et al.

(10) Patent No.: US 11,962,847 B1
(45) Date of Patent: Apr. 16, 2024

(54) CHANNEL HIATUS CORRECTION METHOD AND HDMI DEVICE

(71) Applicant: MEDIATEK INC., Hsinchu (TW)

(72) Inventors: Chia-Hao Chang, Hsinchu (TW); You-Tsai Jeng, Hsinchu (TW); Kai-Wen Yeh, Hsinchu (TW); Yi-Cheng Chen, Hsinchu (TW); Te-Chuan Wang, Hsinchu (TW); Kai-Wen Cheng, Hsinchu (TW); Chin-Lung Lin, Hsinchu (TW); Tai-Lai Tung, Hsinchu (TW); Ko-Yin Lai, Hsinchu (TW)

(73) Assignee: MEDIATEK INC., Hsinchu (TW)

(*) Notice: Subject to any disclaimer, the term of this patent is extended or adjusted under 35 U.S.C. 154(b) by 0 days.

(21) Appl. No.: 18/054,022

(22) Filed: Nov. 9, 2022

(51) Int. Cl.
*H04N 21/4363* (2011.01)
*H04N 21/4405* (2011.01)

(52) U.S. Cl.
CPC ... *H04N 21/4405* (2013.01); *H04N 21/43635* (2013.01)

(58) Field of Classification Search
None
See application file for complete search history.

(56) References Cited

U.S. PATENT DOCUMENTS

| | | | |
|---|---|---|---|
| 2011/0148672 A1* | 6/2011 | Ventura Domingo | G06F 1/3278 713/320 |
| 2011/0150216 A1* | 6/2011 | Barry | G09G 5/006 380/201 |
| 2013/0100244 A1* | 4/2013 | Suzuki | H04N 21/4122 348/E9.037 |
| 2013/0195218 A1* | 8/2013 | Whitby-Strevens | H04B 15/00 375/296 |
| 2014/0053212 A1* | 2/2014 | Shoykher | H04N 17/04 725/59 |
| 2014/0219368 A1* | 8/2014 | Whitby-Strevens | H04L 25/03866 375/257 |
| 2014/0269954 A1* | 9/2014 | Whitby-Strevens | G09G 5/006 375/259 |
| 2015/0036756 A1* | 2/2015 | Choi | H04L 25/0266 375/240.26 |
| 2015/0334333 A1* | 11/2015 | Kuwahara | H04N 21/485 348/552 |
| 2016/0127771 A1* | 5/2016 | Pasqualino | H04N 19/65 348/474 |

* cited by examiner

Primary Examiner — William J Kim
(74) Attorney, Agent, or Firm — McClure, Qualey & Rodack, LLP (57) ABSTRACT

A channel hiatus correction method for an HDMI device is provided. A recovery code from scrambled data of the stream is obtained. A liner feedback shift register (LFSR) value of channels of the HDMI port is obtained based on the recovery code and the scrambled data of the stream. The stream is de-scrambled according to the LFSR value of the channels of the HDMI port. Video data is displayed according to the de-scrambled stream.

16 Claims, 6 Drawing Sheets

FIG. 1

| LFSR Output Value | Data Channel 0 LFSR Value [15:0] | Data Channel 1 LFSR Value [15:0] | Data Channel 2 LFSR Value [15:0] |
|---|---|---|---|
| Seed Value | FFFF | FFFE | FFFD |
| 1 | 77EB | 76EB | 75EB |
| 2 | 4B7C | 737D | 3B7E |
| 3 | A445 | 3D78 | AE3E |
| 4 | DDBD | 3838 | 2EB6 |
| 5 | EDCE | A03D | 7628 |
| 6 | FEFA | 45B9 | B07D |
| 7 | 4AEA | 094A | CDAA |
| 8 | 0A44 | 8A08 | 32DD |
| 9 | CC0B | 5095 | CD36 |
| 10 | ABDC | 355C | AEDD |
| 11 | 14B3 | E431 | CDB6 |
| 12 | 9B17 | C1F2 | 2EDD |
| 13 | BF87 | 72D0 | 1D28 |
| 14 | 67A4 | A879 | C01F |
| 15 | CC6F | F9B0 | A7D1 |
| 16 | CFDC | A8ED | 01BE |
| 17 | 34DF | 6DB0 | 8601 |
| 18 | 5F30 | 5064 | 4198 |
| 19 | C052 | C45C | C84E |
| 20 | EAD1 | 04D5 | 0ED8 |
| 21 | 49FD | 3504 | B00F |
| ⋮ | ⋮ | ⋮ | ⋮ |

CHANNEL HIATUS CORRECTION METHOD AND HDMI DEVICE

BACKGROUND OF THE INVENTION

Field of the Invention

The invention relates to an audio and video transmitting technology, and more particularly to channel hiatus correction of High-Definition Multimedia Interface (HDMI) technology.

Description of the Related Art

High-Definition Multimedia Interface (HDMI) is a licensable audio/video connector interface for transmitting uncompressed or compressed, encrypted digital streams. Video and Audio data provided by various DRM-enforcing digital audio/video source devices, such as a set-top box, a HD DVD Disc player, a Blu-ray Disc player, a Personal Computer, a video game console or an AV receiver, can be transmitted to compatible HDMI sink devices such as a digital television (DTV) via the HDMI digital interface. The HDMI standard is initially introduced in 2006 on consumer HDTV camcorders and high-end digital still cameras, representing the DRM (Digital rights management) alternative to consumer analog standards such as RF (coaxial cable), composite video, S-Video, SCART, component video and VGA, and digital standards such as DVI (DVI-D and DVI-I).

HDCP (High-bandwidth Digital Content Protection) is a standard for protecting digital content over certain interfaces; between, for example, a set-top box (STB) transmitting audio and video over HDMI interface and a television receiving HDMI. Protection is accomplished by encrypting the data before it leaves the transmitter. A legitimate receiver then decrypts the data.

In the current HDMI technology, the fast switch function between HDMI ports is required. However, when the user switches from one HDMI port to another HDMI port, because of the HDCP encryption and decryption, the sink device and the source device are required to perform some synchronization operations first. Therefore, when the user switches one HDMI port to another HDMI port, the user may have to wait a long time to see the video displayed in the electronic device corresponding to another HDMI port. Furthermore, although all HDMI ports turned on can synchronize all the HDMI lane signals in advance to reduce the wait time, high power consumption will be an issue.

BRIEF SUMMARY OF THE INVENTION

A channel hiatus correction method and a high-definition multimedia interface (HDMI) device are provided. An embodiment of a channel hiatus correction method for an HDMI device is provided. A recovery code from scrambled data of the stream is obtained. A liner feedback shift register (LFSR) value of channels of the HDMI port is obtained based on the recovery code and the scrambled data of the stream. The stream is de-scrambled according to the LFSR value of the channels of the HDMI port. Video data is displayed according to the de-scrambled stream.

Furthermore, an embodiment of a high-definition multimedia interface (HDMI) device is provided. The HDMI device includes an HDMI interface, a controller coupled to the HDMI interface, and a display device coupled to the controller. The HDMI interface includes a plurality of HDMI ports. The controller is configured to obtain a stream from a source device through a first HDMI port of HDMI ports and includes a channel hiatus corrector and a de-scrambler. The channel hiatus corrector is configured to obtain a linear feedback shift register (LFSR) value of channels of the first HDMI port based on scrambled data of the stream and a recovery code. The de-scrambler is configured to de-scramble the stream according to the LFSR value of channels of the first HDMI port. The display device is configured to display video data according to the de-scrambled stream.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Some variations of the embodiments are described. Throughout the various views and illustrative embodiments, like reference numbers are used to designate like elements. It should be understood that additional operations can be provided before, during, and/or after a disclosed method, and some of the operations described can be replaced or eliminated for other embodiments of the method.

Figure 1:
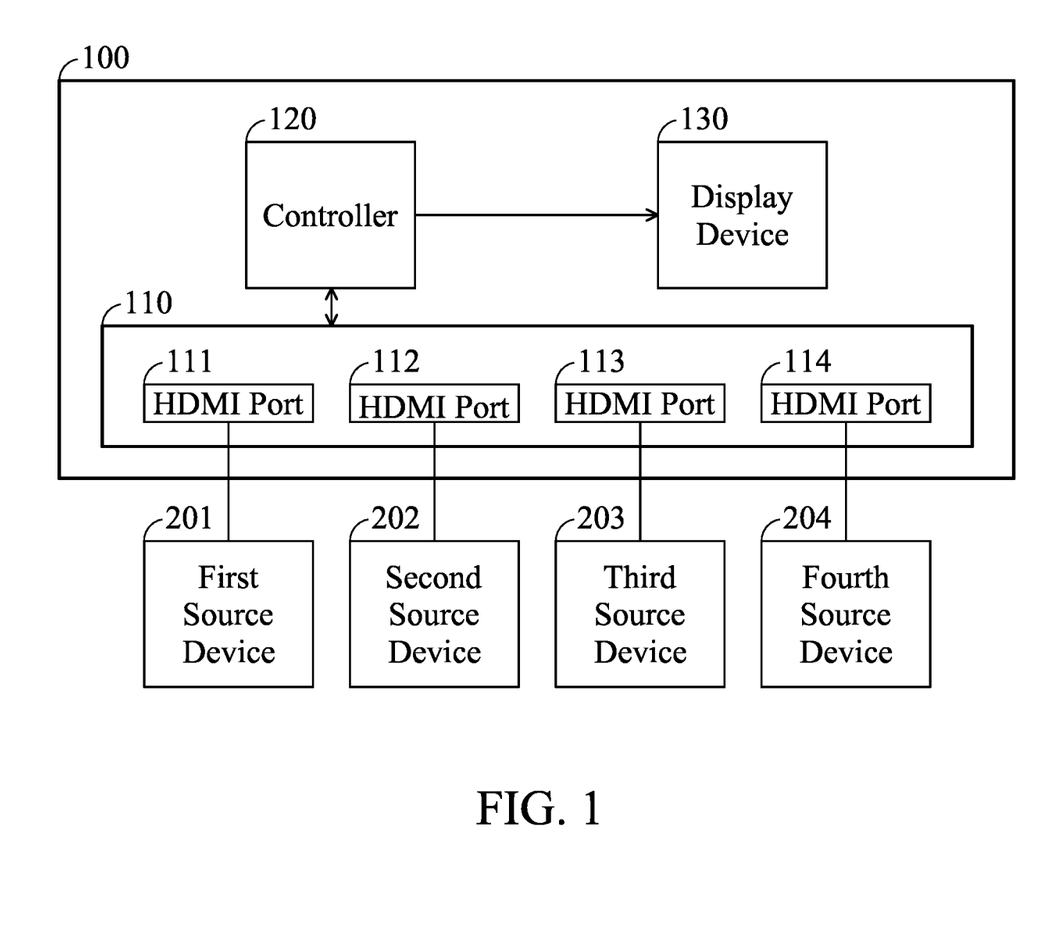
FIG. 1 is a High Definition Multimedia Interface (HDMI) device according to some embodiments of the invention.

FIG. 1 is a High Definition Multimedia Interface (HDMI) device 100 according to some embodiments of the invention. In the embodiments, the HDMI device 100 can be regarded as a sink device which can support the High Bandwidth Digital Content protection (HDCP) technology, e.g. a television, a repeater or a displaying device, but the invention should not limited thereto.

In FIG. 1, the HDMI device 100 may include an HDMI interface 110, a controller 120 and a display device 130. The HDMI interface 110 may include a plurality of HDMI ports (e.g., a first HDMI port 111, a second HDMI port 112, a third HDMI port 113 and a fourth HDMI port 114, but the invention should not be limited thereto). Each HDMI port is configured to connect a respective source device. For example, the first HDMI port 111, the second HDMI port 112, the third HDMI port 113 and the fourth HDMI port 114 are connected to the first source device 201, the second source device 202, the third source device 203 and the fourth source device 204 through a respective HDMI connector (i.e., a respective HDMI link), respectively.

The first source device 201, the second source device 202, the third source device 203 and the fourth source device 204 may include DVD player, HD DVD Player, Set Top Box, Game Console, and Blue-Ray Player, but the invention should not be limited thereto.

It should be noted that, in order to clarify the concept of the invention, FIG. 1 is a simplified block diagram in which only the elements relevant to the invention are shown. However, the invention should not be limited to what is shown in FIG. 1.

In the HDMI interface 110, each HDMI port can be switched to operate in a normal power mode or a power-saving mode. In the normal power mode, the HDMI port is enabled and the HDCP information encrypted by the corresponding source device is provided to the controller 120 through the enabled HDMI port. In the power-saving mode, the HDMI port is disabled, and the HDCP information encrypted by the corresponding source device is not provided to the controller 120.

In one embodiment of the present invention, in the HDMI interface 110, only one HDMI port is enabled at a time. For example, when the first HDMI port 111 is enabled (i.e., in the normal power mode), and the second HDMI port 112, the third HDMI port 113 and the fourth HDMI port 114 are disabled (i.e., in the power-saving mode). Thus, only the HDCP information from the first source device 201 is transmitted to the controller 120 through the HDMI interface 110. Moreover, the controller 120 is configured to provide video data to the display device 130 according to the obtained HDCP information. In the other embodiment of the present invention, all HDMI ports 111, 112, 113, 114 of the HDMI interface 110 could be disabled and operates under the power saving mode.

The HDCP information from the source device (e.g., the first source device 201, the second source device 202, the third source device 203 and the fourth source device 204) includes the transition minimized differential signaling (TMDS) data of data channels. There are three channels (i.e., TMDS channels 0, 1, and 2) in the embodiment of the present invention but this invention is not limited to this. TMDS encoding is performed by the source device so as to decrease the number of transitions between ones and zeros. While encoding the signal, the source device keeps track of whether and what type of transition reduction or minimization has been done. Furthermore, the HDMI device 100 is configured to decode the data using the same mechanism and recreates the original digital signal. TMDS encoding thus ensures proper reception of the signal by clearly demarcating the beginning and end of each byte.

Scrambling is one of the most important features used in the TMDS data. Scrambling is performed to reduce Electro-Magnetic Interference (EMI) and Radio Frequency Interference (RFI) for the TMDS data of the data channels. In the source device, scrambling of the digital data is performed prior to the TMDS encoding. A linear feedback shift register (LFSR) is set to a pre-defined seed value for each of the data channels. In some embodiments, the LFSR value G(x) is obtained according to the LFSR generator polynomial, as following equation:

$$G(x)=1+x^{11}+x^{12}+x^{13}+x^{16}.$$

The digital data is then scrambled using specific bits of the LFSR for the respective data channel. Each of the LFSRs is then incremented to its next state. This process is repeated for every character/pixel being transmitted and is reset once per frame.

Figure 2:
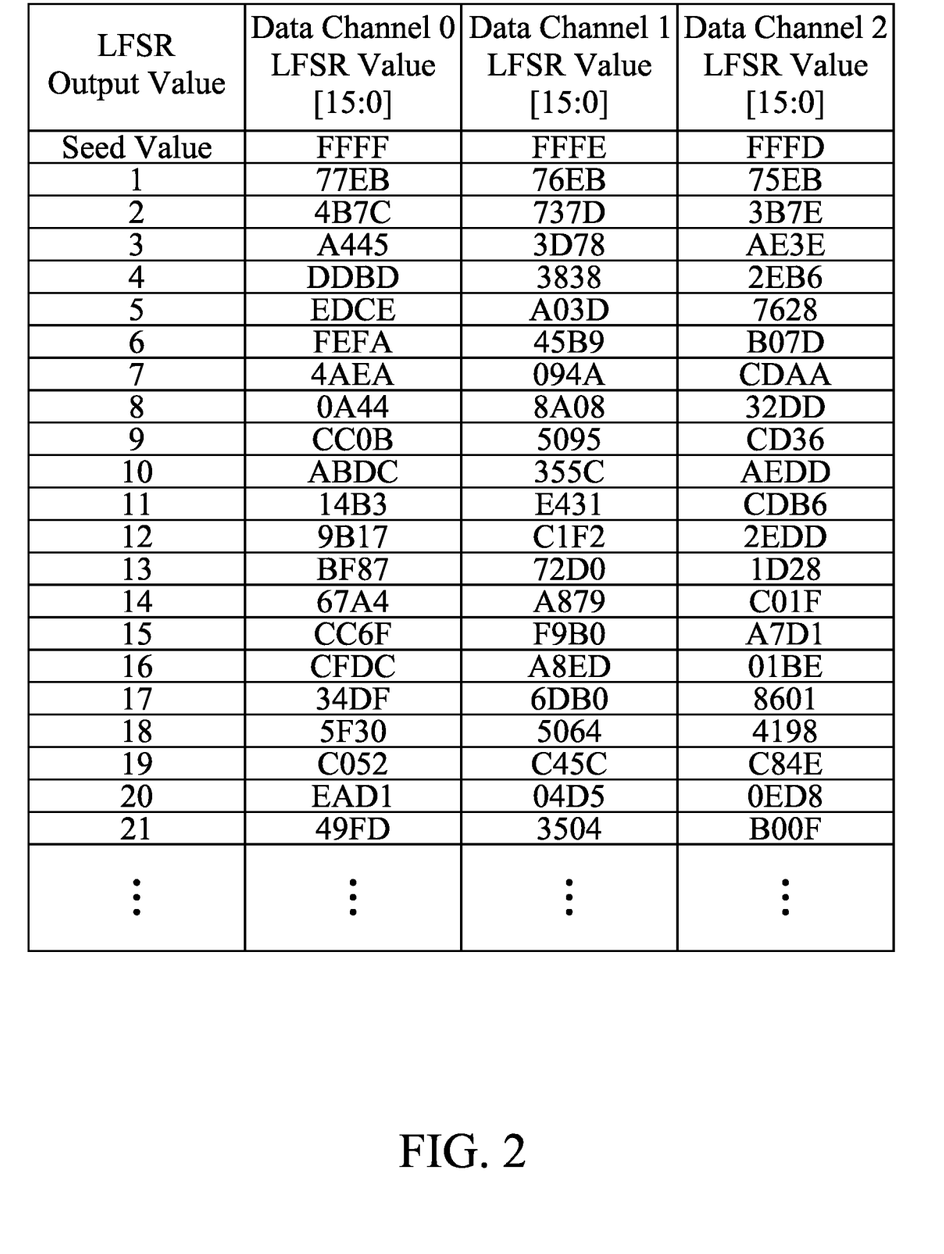
FIG. 2 shows a look-up table of the LFSR values of the data channels 0, 1 and 2 according to some embodiments of the invention.

FIG. 2 shows a look-up table of the LFSR values of the data channels 0, 1 and 2 according to some embodiments of the invention. To be clear, only a part of the look-up table is illustrated in FIG. 2. In the look-up table of FIG. 2, each row represents a state corresponding to one TDMS data in respective data channel. It should be noted that in the same state, the LFSR values of the data channels 0, 1 and 2 are different.

Scrambling is applied to active video, data islands, guard bands, and most control periods of the TMDS stream. A scrambler synchronization control period (SSCP) is a control period. In general, the source device transmits one SSCP per frame to the HDMI device 100 to maintain character synchronization for the TMDS stream. In other words, the LFSR is used for encoding each data channel in the source device and for decoding each data channel in the HDMI device 100 (e.g., the sink device). The source device simultaneously initializes the LFSRs with the appropriate seed values, 16'hFFFF for the data channel 0, 16'hFFFE for the data channel 1, and 16'hFFFD for the data channel 2, when the source device transmits the 8-character sequence of Unscrambled Control Codes (UCC) in the SSCP. Next, the HDMI device 100 initializes the LFSRs with the seed values when it receives an 8-character sequence of UCC in the SSCP on the data channels simultaneously. The seed values are used to scramble/de-scramble the first character on each channel following the UCC sequence.

The UCC of the SSCP is used for character synchronization, inter-channel synchronization, and LFSR reset. In some embodiments, the source device is configured to transmit the UCC on all data channels simultaneously. Furthermore, the source device is configured to reinitialize the LFSRs thereof when the UCC is transmitted.

Figure 3:
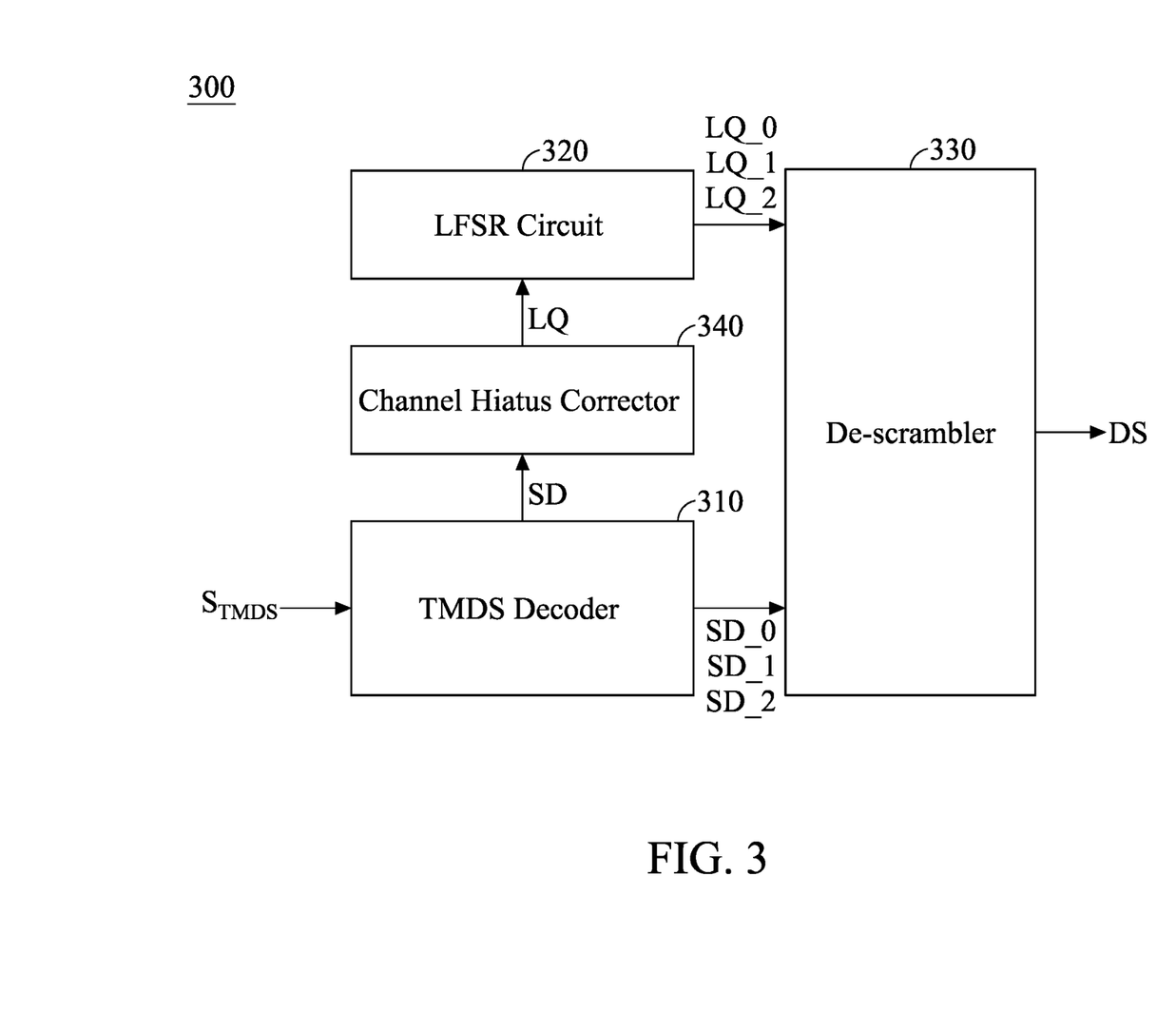
FIG. 3 is a controller of an HDMI device according to some embodiments of the invention.

FIG. 3 is a controller 300 of an HDMI device according to some embodiments of the invention. The controller 300 is an implementation of the controller 120 depicted in FIG. 1. The controller 300 includes a TMDS decoder 310, an LFSR circuit 320, a de-scrambler 330 and a channel hiatus corrector 340.

It should be noted that, in order to clarify the concept of the invention, FIG. 3 is a simplified block diagram in which only the elements relevant to the invention are shown. However, the invention should not be limited to what is shown in FIG. 3.

The TMDS decoder 310 is configured to decode the TMDS stream $S_{TMDS}$ to obtain the decoded TMDS data SD_0, SD_1 and SD_2 for the data channels 0, 1 and 2, respectively. In some embodiments, the TMDS stream $S_{TMDS}$ is obtained from the continuously enabled HDMI port, i.e., the TMDS stream $S_{TMDS}$ includes the entire data of a video frame. In some embodiments, the TMDS stream $S_{TMDS}$ is obtained from an HDMI port that has just been enabled, for example, the HDMI port has just switched from the power-saving mode to the normal power mode or a source device has just been plugged into the HDMI port. Thus, the TMDS stream $S_{TMDS}$ may not include the entire data of a video frame.

When the TMDS stream $S_{TMDS}$ includes all data of a video frame, the TMDS decoder 310 may obtain the character of SSCP from the decoded TMDS data SD_0, SD_1 or SD_2. In response to the character of SSCP, the LFSR circuit 320 is configured to synchronously provide the LFSR values LQ_0, LQ_1 and LQ_2 for the data channels 0, 1 and 2, respectively. After obtaining the LFSR values LQ_0, LQ_1 and LQ_2 and the decoded TMDS data SD_0, SD_1 and SD_2, the de-scrambler 330 is configured to de-scramble the decoded TMDS data SD_0, SD_1 and SD_2 with the LFSR values LQ_0, LQ_1 and LQ_2, so as to obtain the de-scrambled data DS. According to the de-scrambled data DS, the controller 300 is configured to provide the video data to the display device 130 of FIG. 1 to be displayed.

When the TMDS stream $S_{TMDS}$ is obtained from an HDMI port that has just been enabled, the TMDS stream $S_{TMDS}$ may not include the entire data of a video frame, and the TMDS decoder 310 may not obtain the character of SSCP from the decoded TMDS data SD_0, SD_1 or SD_2. In other words, the TMDS stream $S_{TMDS}$ is free of the character of SSCP. The TMDS decoder 310 is configured to provide the decoded TMDS data SD to the channel hiatus corrector 340. In some embodiments, the decoded TMDS data SD may be the decoded TMDS data SD_0, SD_1 or SD_2. In some embodiments, the decoded TMDS data SD may be a combination of the decoded TMDS data SD_0, SD_1 and SD_2.

The channel hiatus corrector 340 is configured to recover the LFSR value LQ corresponding to the decoded TMDS data SD when there is no SSCP for LFSR synchronization. After obtaining the LFSR value LQ corresponding to the decoded TMDS data SD, the channel hiatus corrector 340 is configured to provide the LFSR value LQ to the LFSR circuit 320. Thus, in response to the LFSR value LQ, the LFSR circuit 320 is configured to provide the correct LFSR values LQ_0, LQ_1 and LQ_2 for the data channels 0, 1 and 2, respectively, and the LFSR value LQ is equal to one of the LFSR values LQ_0, LQ_1 and LQ_2. In other words, the LFSR circuit 320 is configured to synchronously provide the LFSR values LQ_0, LQ_1 and LQ_2 for the data channels 0, 1 and 2, respectively. After obtaining the LFSR values LQ_0, LQ_1 and LQ_2 and the decoded TMDS data SD_0, SD_1 and SD_2, the de-scrambler 330 is configured to de-scramble the decoded TMDS data SD_0, SD_1 and SD_2 with the LFSR values LQ_0, LQ_1 and LQ_2, so as to obtain the de-scrambled data DS. According to the de-scrambled data DS, the controller 300 is configured to provide the video data to the display device 130 of FIG. 1 to be displayed. Thus, the user can see the video data displaying by the display device 130 immediately without waiting for the SSCP of the next video frame or performing channel hiatus correction (CHC) algorithm. Compared with the CHC algorithm, the channel hiatus corrector 340 has a lower power consumption to sync LFSR values.

Figure 4:
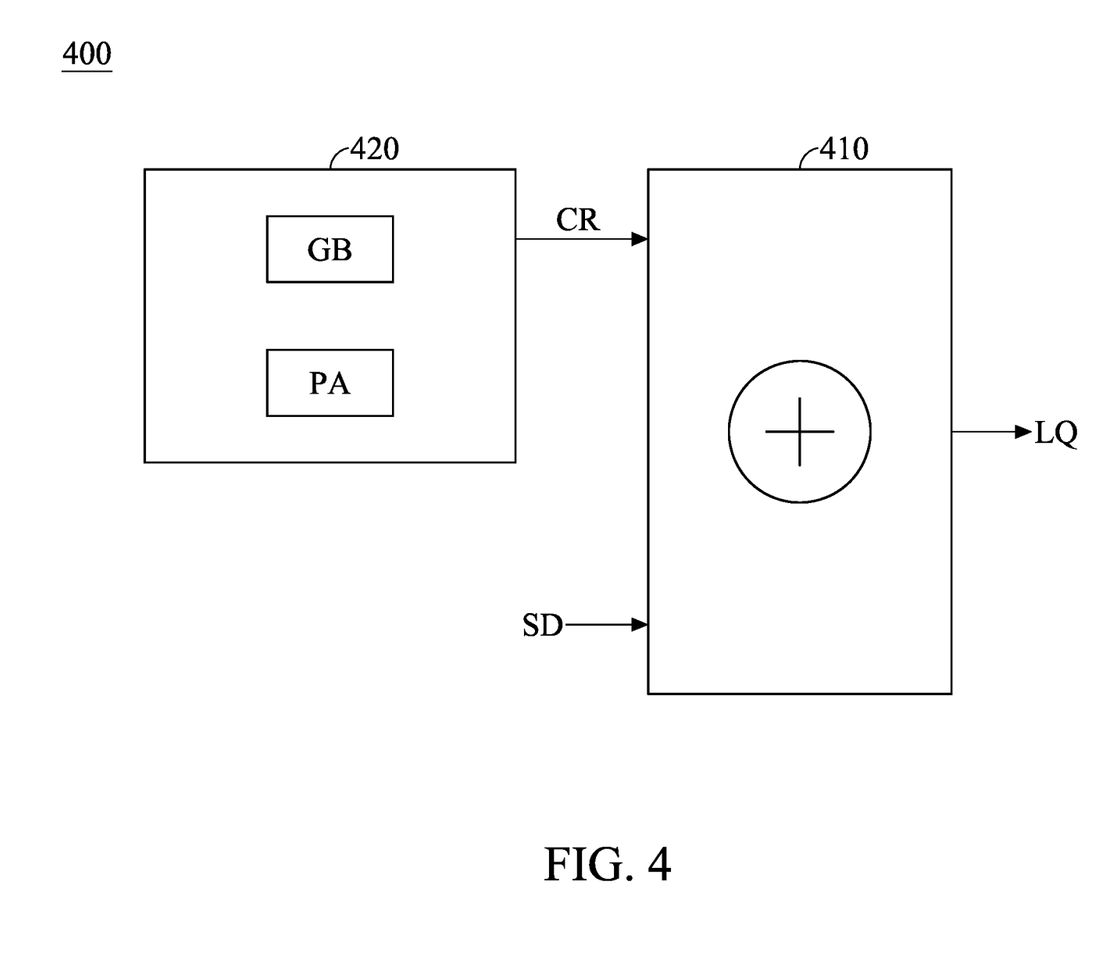
FIG. 4 is a channel hiatus corrector of an HDMI device according to some embodiments of the invention.

FIG. 4 is a channel hiatus corrector 400 of an HDMI device according to some embodiments of the invention. The channel hiatus corrector 400 is an implementation of the channel hiatus corrector 340 depicted in FIG. 3. The channel hiatus corrector 400 includes a recovery circuit 410 and a calculation device 420.

It should be noted that, in order to clarify the concept of the invention, FIG. 4 is a simplified block diagram in which only the elements relevant to the invention are shown. However, the invention should not be limited to what is shown in FIG. 4.

In one embodiment, the recovery circuit 410 is configured to perform an exclusion-OR (XOR) operation on the decoded TMDS data SD from the TMDS decoder 310 and a recovery code CR, so as to obtain the LFSR value LQ corresponding to the decoded TMDS data SD, i.e., LQ=SD⊕CR (or LQ=SD^CR). As described above, the decoded TMDS data SD is the TMDS data scrambled by the source device. In some embodiments, the recovery circuit 410 is integrated in the LFSR circuit 320 of FIG. 3. In some embodiments, the recovery circuit 410 is implemented in a processor of the HDMI device 100.

As described above, in response to the LFSR value LQ, the LFSR circuit 320 of FIG. 3 is configured to provide the correct LFSR values LQ_0, LQ_1 and LQ_2 for the data channels 0, 1 and 2, respectively. For example, referring to FIG. 2, if the LFSR value LQ is equal to "CC6F" of the hexadecimal data, the LFSR circuit 320 is configured to find the position of "CC6F" of the hexadecimal data in the look-up table. In this embodiment, "CC6F" of the hexadecimal data is the fifteenth LFSR value (or the fifteenth LFSR state) in the data channel 0. Thus, the LFSR circuit 320 is configured to assign "CC6F" as the LFSR value LQ_0 for the data channel 0, assign "F9B0" as the LFSR value LQ_1 for the data channel 1, and assign "A7D1" as the LFSR value LQ_2 for the data channel 2. Thus, the LFSR values of the data channels are recovered, and then the subsequent scrambling operations of the de-scrambler 330 can be performed. In such embodiment, the LFSR circuit 320 of FIG. 3 is configured to use the LFSR value LQ to find the corresponding LFSR state, so as to provide the the LFSR values LQ_0, LQ_1 and LQ_2 of the corresponding LFSR state. As described above, the LFSR value LQ is equal to the LFSR values LQ_0, LQ_1 or LQ_2 of the corresponding LFSR state.

The calculation device 420 is configured to provide the recovery code CR according to the information stored in the calculation device 420. In some embodiments, the calculation device 420 is configured to provide the guard band data GB as the recovery code CR. In some embodiments, the calculation device 420 is configured to provide the preamble data PA as the recovery code CR. In the other embodiment of the present invention, the recovery code CR is not limited to the guard band data GB and the preamble data PA. All specific codewords obtained in the TMDS stream for deriving the LFSR values are the recovery code CR.

In some embodiments, the guard band data GB and the preamble data PA are pre-stored in the calculation device 420. In some embodiments, the guard band data GB and the preamble data PA are obtained from a previous TMDS stream, i.e., the decoded TMDS data in the previous video frame.

The guard band data GB is obtained according to the characters in the island leading guard band period, the island trailing guard band period, or the video leading guard band period. In some embodiments, the characters in the island leading guard band period, the island trailing guard band period, the video leading guard band period may or may not be scrambled by the source device. Moreover, the preamble data PA is obtained according to the characters in the preamble of the data island period or the video data period. In some embodiments, the characters in the preamble of the data island period or the video data period may or may not be scrambled by the source device.

Figure 5:
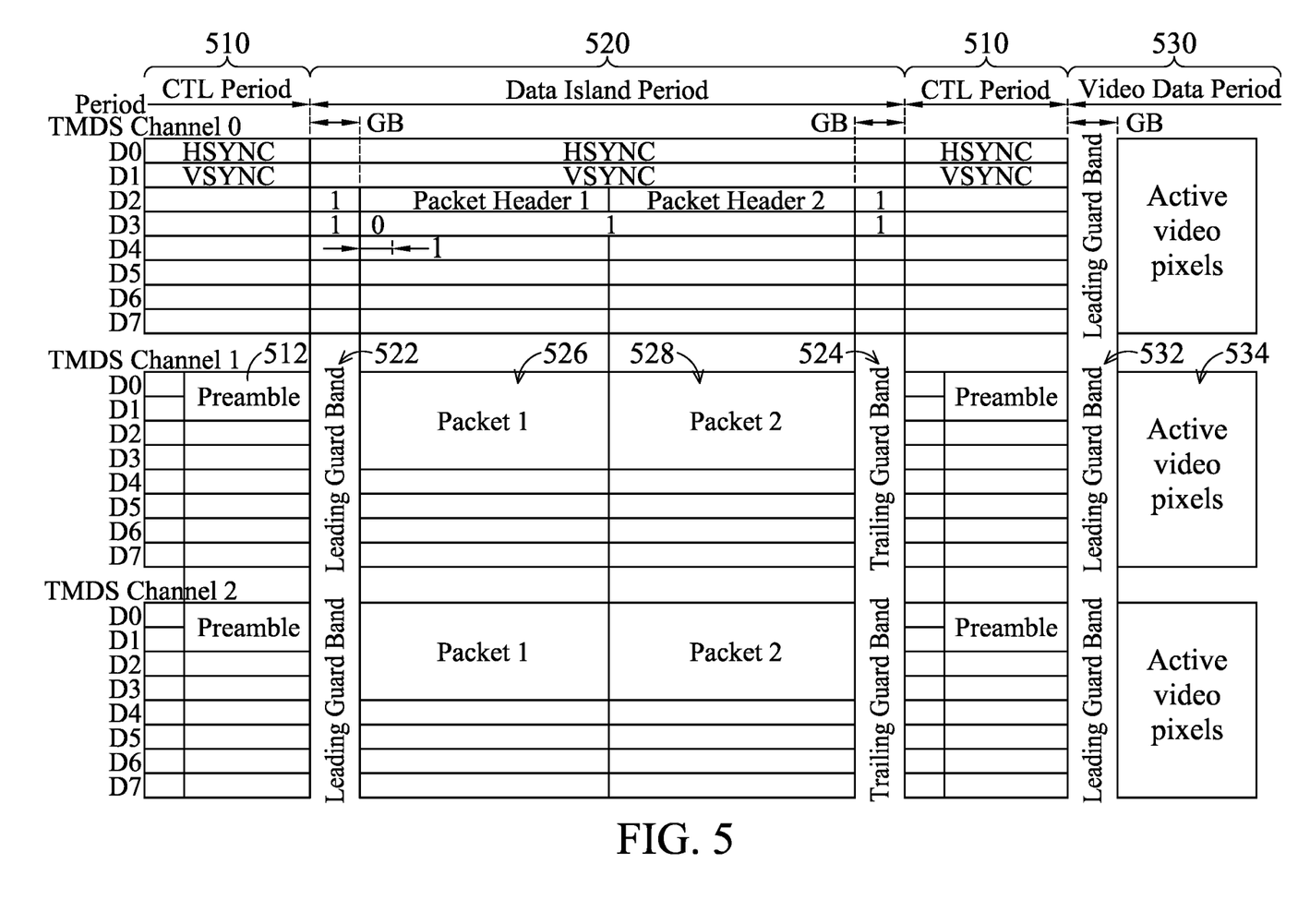
FIG. 5 is an example illustrating data in TMDS stream provided by the source device during different periods for transmission over the data channels according to some embodiments of the invention.

FIG. 5 is an example illustrating data in TMDS stream provided by the source device during different periods for transmission over the data channels according to some embodiments of the invention. The configurations of the data channels are similar.

The data of a video frame transmitted by the source device can be divided into different types of periods: the control period 510, the data island period 520, and the video data period 530.

In FIG. 5, two control periods 510 are present. Each control period 510 precedes each of the data island period 520 and the video data period 530. During each control period 510, a preamble 512 is present. In some embodiments, the preamble 512 is a sequence of eight identical 2-bit control characters identifying whether the data following the preamble 512 is video data or data island data. The preamble 512 is scrambled and converted into control codes in the control period 510.

During the data island period 520, the TMDS stream includes the leading guard band data 522 and trailing guard band data 524. The leading guard band data 522 provides a transition between the first control period 510 and data island period 520. The trailing guard band data 524 provides a transition between the data island period 520 and the second control period 510. In some embodiments, the leading guard band data 522 and trailing guard band data 524 are scrambled and encoded using TMDS encoding.

The data in the data island period 520 includes audio data in the packets 526 and 528. Each of the packets 526 and 528 can include packet data and a header describing the type of the packet data (i.e., audio packet, null packet, InfoFrame packet).

During the video data period 530, the TMDS stream includes the leading guard band data 532, and the active video data 534. The leading guard band data 532 provides a transition between the second control period 510 and the video data period 530. The leading guard band data 532 and the active video data 534 are both scrambled and encoded using TMDS encoding.

In some embodiments, the HDMI device 100 is configured to obtain the preamble data PA according to the preamble 512, and store the preamble data PA in the calculation device 420 of FIG. 4. In some embodiments, the HDMI device 100 is configured to obtain the guard band data GB according to the leading guard band data 522, the trailing guard band data 524, the leading guard band data 532 or the trailing guard band data (not shown), and store the guard band data GB in the calculation device 420.

Figure 6:
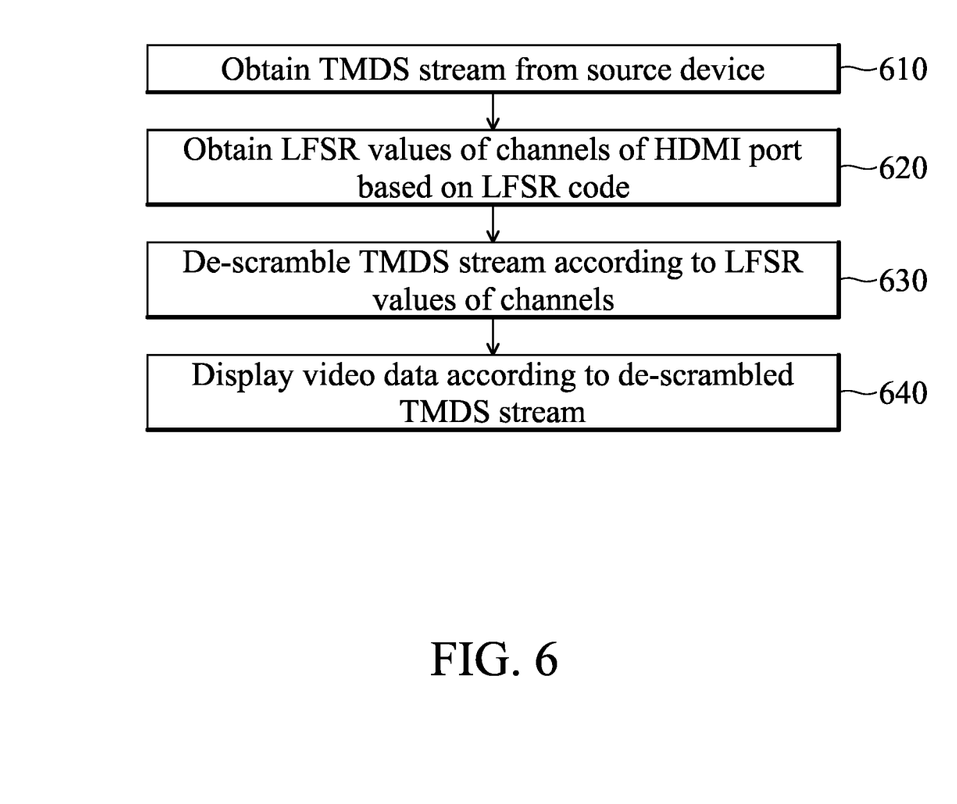
FIG. 6 shows a flowchart of a channel hiatus correction method for an HDMI device according to some embodiments of the invention.

FIG. 6 shows a flowchart of a channel hiatus correction method for an HDMI device according to some embodiments of the invention. The HDMI device is a sink device (e.g., the HDMI device 100) having one or more HDMI ports.

In operation 610, a TMDS stream $S_{TMDS}$ of a video frame from a source device is obtained by the HDMI device through a first HDMI port. As described above, the TMDS stream $S_{TMDS}$ includes the data scrambled by the source device. The first HDMI port has just been enabled, for example, the first HDMI port has just switched from the power-saving mode to the normal power mode when a second HDMI port is disabled (i.e., switching from the normal power mode to the power-saving mode) or a source device has just been plugged into the first HDMI port. Moreover, the TMDS stream $S_{TMDS}$ may not include the entire data of a video frame. For example, the TMDS stream $S_{TMDS}$ may not include the character of SSCP for LFSR synchronization.

In operation 620, an LFSR value LQ is obtained by the HDMI device according to a recovery code CR and the scrambled data of the TMDS stream $S_{TMDS}$. In some embodiments, the recovery code CR is obtained according to the guard band data GB. In some embodiments, the recovery code CR is obtained according to the preamble data PA. In some embodiments, the guard band data GB and the preamble data PA are obtained from a previous TMDS stream. In some embodiments, the guard band data GB and the preamble data PA are pre-stored in the HDMI device. In the other embodiment of the present invention, the recovery code CR is not limited to the guard band data GB and the preamble data PA. All specific codewords obtained in the TMDS stream for deriving the LFSR values are the recovery code CR. Furthermore, In operation 620, according to the LFSR value LQ, the LFSR values LQ_0, LQ_1 and LQ_2 of the data channels are further obtained by the HDMI device. As described above, the HDMI device is configured to find the LFSR value LQ in a look-up table (e.g., the look-up table of FIG. 2) or derive from LFSR Generator Polynomial, $G(x)=1+x^{11}+x^{12}+x^{13}+x^{16}$, based on the LFSR value LQ, so as to obtain the LFSR values LQ_0, LQ_1 and LQ_2.

In operation 630, the HDMI is configured to de-scramble the TMDS stream $S_{TMDS}$ according to the LFSR values LQ_0, LQ_1 and LQ_2 of channels of the first HDMI port. For example, the HDMI is configured to de-scramble the decoded TMDS data SD_0, SD_1 and SD_2 of the TMDS stream $S_{TMDS}$ with the LFSR values LQ_0, LQ_1 and LQ_2, so as to obtain the de-scrambled data DS.

In operation 640, the HDMI device is configured to display a video from the source device based on video data according to the de-scrambled data DS corresponding to the TMDS stream $S_{TMDS}$.

By using the channel hiatus corrector 340 of FIG. 3 to recover the LFSR values when the TMDS stream $S_{TMDS}$ is free of SSCP, fast LFSR synchronization is performed by the sink device for displaying an image without waiting for the SSCP of the next video frame (e.g., 1 frame delay) or performing an CHC algorithm. Therefore, when the user switches from one HDMI port to another HDMI port, the user can immediately see the video data without having to wait for synchronization of the LFSR values of the data channels.

To be clear, the TMDS stream $S_{TMDS}$ is one example of the stream data in the embodiments. The data source of the present invention is not limited to this.

Other aspects and features of the invention will become apparent to those with ordinary skill in the art upon review of the descriptions of embodiments of the HDMI device and the channel hiatus correction method for immediately displaying video without SSCP.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A channel hiatus correction method for a high-definition multimedia interface (HDMI) device, comprising:
    obtaining a stream from a source device through an HDMI port of the HDMI device;
    obtaining a recovery code from scrambled data of the stream, wherein the recovery code is leading guard band data, trailing guard band data, or preamble data from the source device;
    obtaining a linear feedback shift register (LFSR) value of channels of the HDMI port based on the recovery code and the scrambled data of the stream;
    de-scrambling the stream according to the LFSR value of the channels of the HDMI port; and
    displaying video data according to the de-scrambled stream.

2. The channel hiatus correction method as claimed in claim 1, wherein the stream is a transition minimized differential signaling (TMDS) stream and is free of character of a scrambler synchronization control period (SSCP).

3. The channel hiatus correction method as claimed in claim 1, wherein obtaining the LFSR value of channels of the HDMI port based on the recovery code and the scrambled data of the stream further comprises:
    performing an exclusive-OR (XOR) operation on the scrambled data of the stream and the recovery code.

4. The channel hiatus correction method as claimed in claim 1, wherein obtaining the stream from the source device through the HDMI port of the HDMI device further comprises:
    enabling the HDMI port of the HDMI device to receive the stream when disabling another port of the HDMI device.

5. The channel hiatus correction method as claimed in claim 1, wherein obtaining the stream from the source device through the HDMI port of the HDMI device further comprises:
    receiving the stream when the source device is plugged into the HDMI port of the HDMI device.

6. The channel hiatus correction method as claimed in claim 1, wherein obtaining the LFSR value of the channels of the HDMI port based on the recovery code and the scrambled data of the stream further comprises:
    obtaining a first LFSR value of one of the channels when the LFSR value is equal to the first LFSR value; and
    obtaining a second LFSR value and a third LFSR value of the remaining channels,
    wherein the second and third LFSR values correspond to the first LFSR value.

7. The channel hiatus correction method as claimed in claim 6, wherein the first, second and third LFSR values are obtained based on an LFSR generator polynomial with different seed values.

8. The channel hiatus correction method as claimed in claim 1, further comprising:
    obtaining the recovery code according to a previous stream,
    wherein the previous stream comprises character of the SSCP.

9. A high-definition multimedia interface (HDMI) device, comprising:
    an HDMI interface, comprising a plurality of HDMI ports;
    a controller coupled to the HDMI interface and configured to obtain a stream from a source device through a first HDMI port of HDMI ports, and comprising:
        a channel hiatus corrector configured to obtain a linear feedback shift register (LFSR) value of channels of the first HDMI port based on scrambled data of the stream and a recovery code, wherein the recovery code is leading guard band data, trailing guard band data, or preamble data from the source device; and
        a de-scrambler configured to de-scramble the stream according to the LFSR value of channels of the first HDMI port; and
    a display device coupled to the controller, and configured to display video data according to the de-scrambled stream.

10. The HDMI device as claimed in claim 9, wherein the stream is a transition minimized differential signaling (TMDS) stream and is free of character of a scrambler synchronization control period (SSCP).

11. The HDMI device as claimed in claim 9, wherein the channel hiatus corrector is configured to perform an exclusive-OR (XOR) operation on the scrambled data of the stream and the recovery code, so as to obtain the LFSR value.

12. The HDMI device as claimed in claim 9, wherein the controller is configured to enable the first HDMI port of the HDMI interface after disabling a second HDMI port of the HDMI ports in the HDMI interface, so as to receive the stream from the source device through the first HDMI port.

13. The HDMI device as claimed in claim 9, wherein the controller is configured to receive the stream when the source device is plugged into the first HDMI port of the HDMI interface.

14. The HDMI device as claimed in claim 9, wherein the controller is configured to obtain a first LFSR value of one of the channels when the LFSR value is equal to the first LFSR value, and obtain a second LFSR value and a third LFSR value of the remaining channels, wherein the second and third LFSR values correspond to the first LFSR value.

15. The HDMI device as claimed in claim 14, wherein the first, second and third LFSR values are obtained based on an LFSR generator polynomial with different seed values.

16. The HDMI device as claimed in claim 9, wherein the controller is configured to obtain the recovery code according to a previous stream, and the previous stream comprises character of the SSCP.

* * * * *